United States Patent [19]
Bunker et al.

[11] Patent Number: 5,667,241
[45] Date of Patent: Sep. 16, 1997

[54] SEAT MOUNTED SIDE IMPACT AIRBAGS

[75] Inventors: S. Mark Bunker, Ogden; Daniel G. Minert, Clearfield; David J. Green, Brigham City; Davin G. Saderholm, Salt Lake City; J. Kirk Storey, Farmington, all of Utah

[73] Assignee: Morton International, Inc., Chicago, Ill.

[21] Appl. No.: 543,953

[22] Filed: Oct. 17, 1995

[51] Int. Cl.⁶ ........................................... B60R 21/22
[52] U.S. Cl. ........................ 280/730.2; 280/728.2
[58] Field of Search ................... 280/730.2, 728.2, 280/743.1, 728.1, 741

[56] References Cited

U.S. PATENT DOCUMENTS

| | | | |
|---|---|---|---|
| 3,792,873 | 2/1974 | Buchner et al. | |
| 4,006,918 | 2/1977 | MacFarland | 280/743.1 |
| 4,153,273 | 5/1979 | Risko | 280/732 |
| 4,964,654 | 10/1990 | Bishop et al. | 280/728.2 |
| 5,022,675 | 6/1991 | Zelenak, Jr. et al. | |
| 5,094,475 | 3/1992 | Olsson et al. | 280/730.2 |
| 5,240,282 | 8/1993 | Wehner et al. | |
| 5,445,407 | 8/1995 | Lotspih | 280/728.2 |
| 5,468,012 | 11/1995 | Mihm | |
| 5,484,163 | 1/1996 | Jenkins | 280/728.2 |
| 5,498,030 | 3/1996 | Hill et al. | 280/743.1 |
| 5,503,428 | 4/1996 | Awotwi et al. | 280/730.2 |
| 5,503,429 | 4/1996 | Wallner et al. | 280/743.1 |

FOREIGN PATENT DOCUMENTS

| | | | |
|---|---|---|---|
| 4137691 | 11/1992 | Germany | 280/743.1 |
| 4223620 | 1/1993 | Germany | 280/730.2 |
| 2232936 | 1/1991 | United Kingdom | 280/743.1 |

*Primary Examiner*—Eric D. Culbreth
*Attorney, Agent, or Firm*—Taylor J. Ross; Gerald K. White

[57] ABSTRACT

An airbag module and mounting. An inflator is received within the cushion, such that the cushion wraps around the back side of the inflator. The inflator includes an extending fastener, and possibly an extending tab. The inflator, or the tab, is partially retained by a receiving structure on the seat. The fastener extends through another section of the seat, such that securing the fastener secures the entire inflator. Additionally, since the cushion surrounds the inflator, the cushion is also secured. To maintain the cushion in the folded condition, a frangible wrap extends around the cushion and inflator. Upon inflation, the frangible wrap, and the seat covering, are torn by the expanding cushion to permit further expansion. This arrangement eliminates the need for a protective housing for the inflator and cushion. Other mounting arrangements are also provided.

29 Claims, 3 Drawing Sheets

SEAT MOUNTED SIDE IMPACT AIRBAGS

BACKGROUND OF THE INVENTION

1. Field of the Invention

The present invention relates in general to vehicle passive restraint systems of the type typically known as airbags. In particular, the present invention relates to an improved arrangement for mounting side impact airbags to seats.

2. Description of the Related Art

Airbag passive restraint systems generally include a crash sensor, an inflator, and a cushion. The crash sensor determines when the airbag system should be activated, and sends an appropriate signal to the inflator. Upon receipt of the signal, the inflator expels a quantity of gas. This gas is received within the cushion, causing it to inflate to protect the passenger.

The inflator and cushion are typically located in close proximity to form a single unit or module. This module may be placed at any of numerous locations within the vehicle to protect the passenger(s). Of main concern in this invention is the placement of the module such that the inflated cushion is interposed between the passenger and a lateral side of the vehicle. Such a placement is typically referred to as a side impact airbag system.

Even limited to side impact airbag systems, various module placements are known. For example, the module may be placed in the roof of the passenger cabin to inflate downward, or may be placed in the side of the passenger cabin (typically in a passenger door) to inflate generally outward. It is also known to mount the module on the passenger seat, to inflate forward and/or upward.

The mounting of the module on the seat provides certain improvements in safety. For example, many passenger seats permit adjustment of their location within the cabin to accommodate passengers of various sizes comfortably. Mounting the airbag module on the passenger seat ensures that the location of the inflated cushion with respect to the passenger will be the same regardless of the position of seat.

Unfortunately, mounting the module to the seat also causes some difficulties. For example, the module must be of a relatively small size to provide an acceptable aesthetic appearance. This is difficult, since a typical module includes an inflator, a housing surrounding the inflator, a folded cushion secured to the housing, and a frangible housing door to permit the inflating cushion to escape. Additionally, to permit easier adjustment of the seat position, and to improve overall fuel economy, the module should be as light weight as possible.

SUMMARY OF THE INVENTION

An object of the present invention is to provide a seat-mounted side impact airbag module which improves passenger safety.

Yet another object of the present invention is to provide such a module which is light weight.

Yet another object of the present invention is to provide such a module which is small in size.

Another object of the present invention is to provide such a module which is quickly and easily mounted to the passenger seat.

Another object of the present invention is to provide such a module which may be secured to the passenger seat by a single fastener.

A further object of the present invention is to provide such a module which does not include a housing, to reduce weight, size and cost.

Yet another object of the present invention is to provide such a module in which the inflator is positioned in the cushion and the inflator retains the cushion in position.

Yet a further object of the present invention is to provide such an inflator in which the folded cushion is retained in position by a frangible wrap.

These and other objects are achieved by an airbag module and mounting. An inflator is received within the cushion, such that the cushion wraps around the back side of the inflator. The inflator includes an extending fastener, and possibly an extending tab. The inflator, or the tab, is partially retained by a receiving structure on the seat. The fastener extends through another section of the seat, such that securing the fastener secures the entire inflator. Additionally, since the cushion surrounds the inflator, the cushion is also secured. To maintain the cushion in the folded condition, a frangible wrap extends around the cushion and inflator. Upon inflation, the frangible wrap, and the seat covering, are torn by the expanding cushion to permit further expansion. This arrangement eliminates the need for a protective housing for the inflator and cushion.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
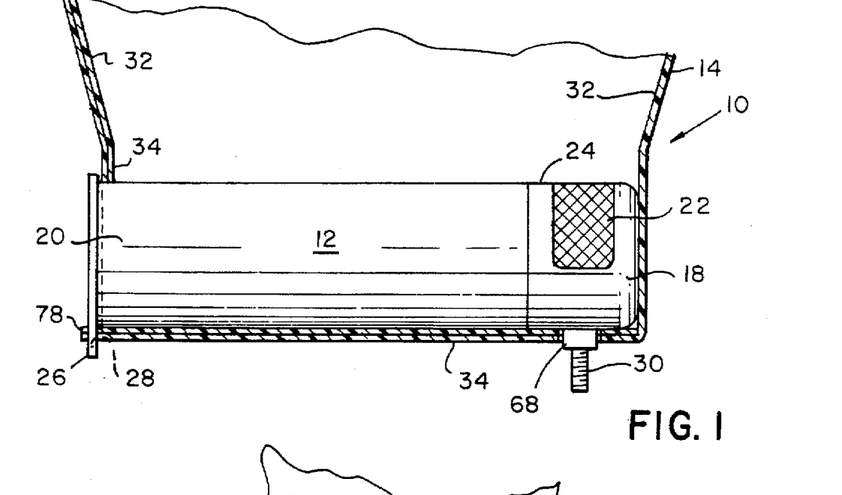
FIG. 1 is a side view in of an airbag module according to a first embodiment of the invention.
Figure 3:
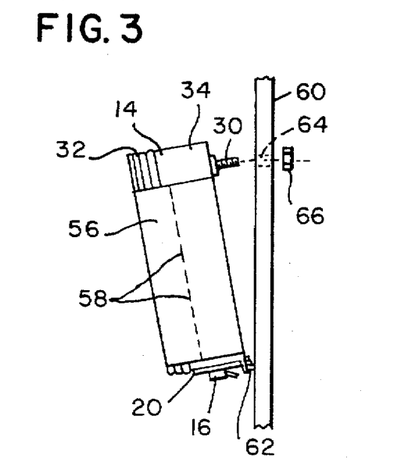
FIG. 3 is a side view showing the mounting of the module of FIG. 1.

With reference to FIG. 1, a first embodiment of an airbag module according to the present invention is generally designated by reference numeral 10. The module 10 includes an inflator 12 for generating a gas, and a cushion 14 which will receive the gas to inflate. As best shown in FIG. 3, the inflator will be connected to an appropriate sensor harness 16 to supply the inflator with a signal to begin inflation upon a crash sensor (not shown) detecting an impact. It is preferred that the inflator module be mounted for, and the crash sensor detect, a side impact. While preferred, the module and crash sensor could be located for impacts from other directions.

Returning to FIG. 1, the inflator 12 has a generally elongated shape, with front and rear ends 18 and 20. It is noted that terms such as "right", "left" and "front" will be used for convenience, but do not imply any final orientation of the module on the vehicle. As shown, the inflator has a generally cylindrical shape, although other shapes may be employed. Adjacent the front end 18 the inflator includes one or more gas exit ports 22 through which the gas will exit the inflator to enter the cushion. As shown, the port 22 is located at a diffuser 24, although ports could be located along the entire length, or at least a greater portion of the length, of the inflator.

Up to this point, the description of the inflator has conformed to known designs in the prior art. The first differences noted in the inflator, which comprise the present invention, are in the mounting arrangements.

At the rear end 20, the inflator includes a radially or outwardly extending mounting tab 26. The tab 26 is cantilevered, and includes an aperture 28 adjacent the free end. Although a deep depression could be used, as will be apparent below, an actual through-hole aperture is preferred. As shown, the tab 26 extends directly outward from the inflator in a straight line, but various bends and turns could also be used.

At the front end, the inflator includes a radially or peripherally outward extending mounting bolt 30. The bolt 30 is a threaded member secured, preferably by welding, to the inflator. As with the tab, the bolt is a cantilevered member, and includes a free end. While the bolt 30 has been shown extending from the inflator generally parallel to, and in the same direction as, the tab, it will be apparent below that the bolt need not be so oriented.

The second main component of the module 10 is the cushion 14. The cushion 14 will include a main body 32 (shown in the folded condition in FIG. 3) which may be of any known inflated shape for side-impact or other types of impacts, and will be formed of typical flexible material(s). The folded main body will be held against the inflator 12, typically at a position corresponding to the location of the ports 22. The differences in the cushion 14 over the prior art lie in the connection between the inflator and the cushion.

Figure 2:
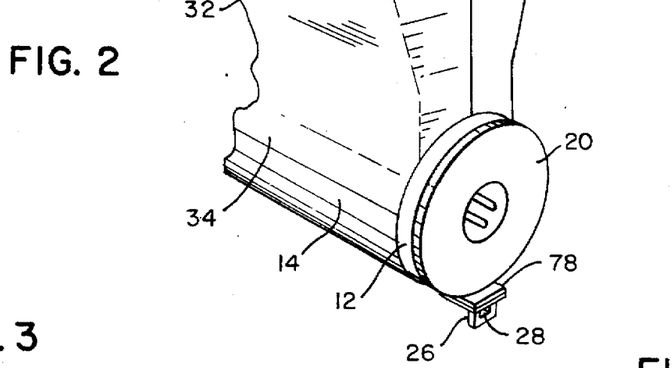
FIG. 2 is a perspective view showing the attachment of the cushion to the inflator.
Figure 5:
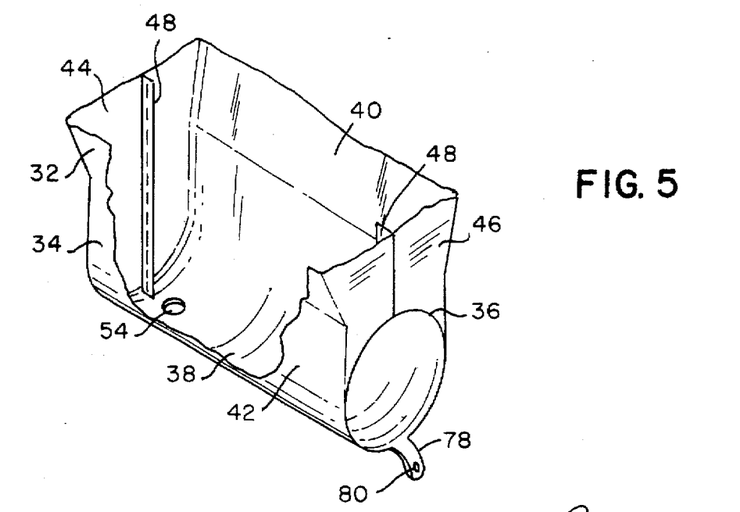
FIG. 5 is a perspective view of a first embodiment of a cushion extension to receive an inflator.
Figures 6, 7, 8:
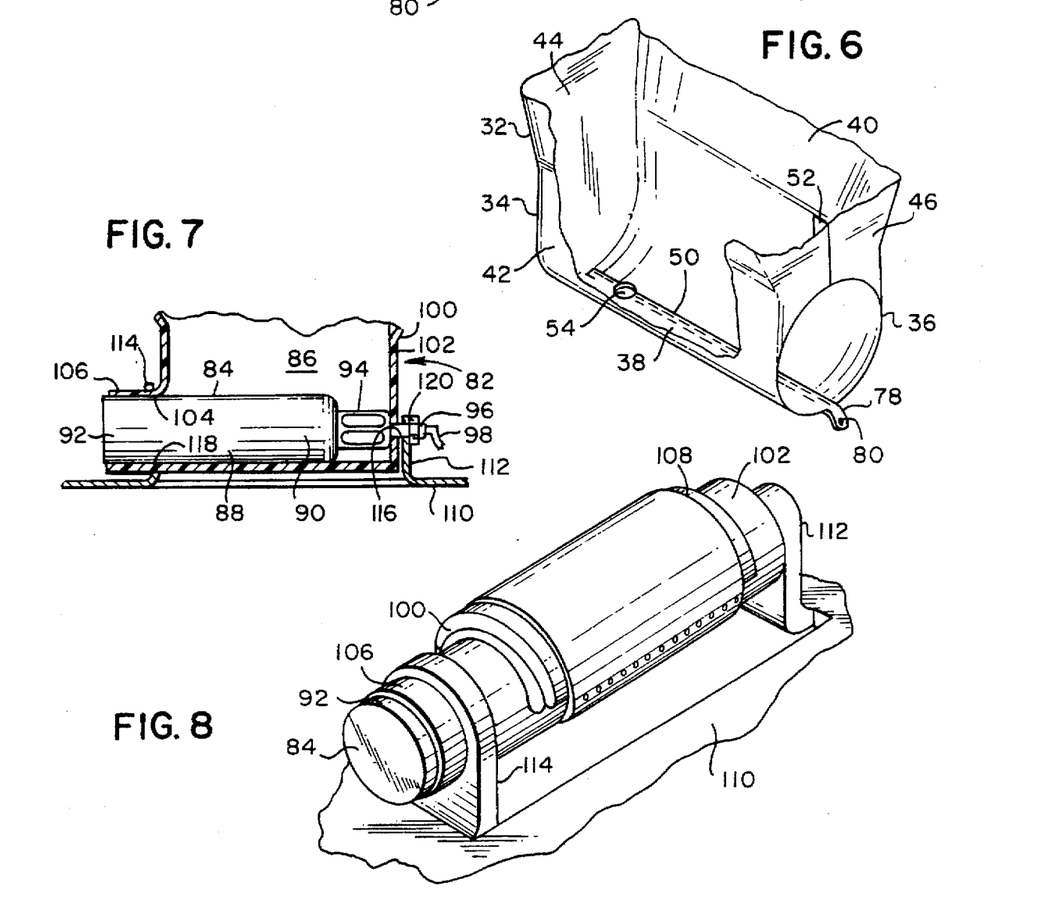
FIG. 6 is a perspective view of a second embodiment of a cushion extension to receive an inflator.
FIG. 7 is a side view with partial cutaway of a second embodiment of a module, mounted according to a first arrangement.
FIG. 8 is a perspective view of the module of FIG. 7.

As may be seen by comparison of FIGS. 1 and 2, the cushion 14 does not include a well defined mouth to communicate with the inflator. Instead, the body includes an integral or monolithic mounting extension 34 which wraps about the inflator, with the inflator extending from an inflator opening 36 in the extension. The extension 34 may be formed in several ways, depending upon the construction of the cushion. Two examples are shown in FIGS. 5 and 6. For each example the extension 34 will be discussed as a generally rectangular block, even though the portion wrapped about the inflator may be semi-cylindrical, and the final inflated cross-section of the cushion may be elliptical. This "block" convention is used only for ease of description.

A first example is shown in FIG. 5. The extension is seen to have a bottom wall 38 which will be below the inflator, right and left side walls 40 and 42, respectively, extending upward from the bottom wall, and front and rear walls 44 and 46, respectively, extending between the side walls. There is of course a top wall (not shown) to complete the enclosure of the cushion. However, the shape of the cushion beyond the extension 34 may take a variety of different shapes independent of the extension 34, and as such is not shown.

In this first example, it is seen that the extension (and preferably the remainder of the cushion) is formed by an elongated strip of cushion material. The bottom wall 38 is defined by a central portion of the material, extending across the short dimension. By folding the ends of such a strip upward, the side walls 40 and 42 are formed. Finally, the vertically extending edges of these ends are brought together and secured at seams 48 to form the front and rear walls. The seam on the rear wall does not extend to the bottom wall, thus creating the opening 36 to receive the inflator. The seams may be formed by various known means, such as adhesives, or thermal or ultrasonic welding. Stitching, however, is preferred.

In the second example, shown in FIG. 6, the central portion of the material strip would form the front wall 44, with the ends being folded rearward to form the side walls 40 and 42. A horizontally edge of these ends may then be brought together and secured at seam 50, creating the bottom wall 38. Finally, the vertically extending ends may be brought together and secured at seam 52 to form the rear wall 46. As before, seam 52 does not extend to the bottom wall, thus creating the opening 36 to receive the inflator. As noted, other arrangements are possible, such as reversing the arrangement of FIG. 6, causing the seam 52 to extend up the front wall 44. This would require that a separate opening 36 be cut, but would be a viable arrangement.

With all the arrangements described above, it may be seen that the inflator may be securely received within the cushion, or more appropriately, that the cushion may be securely retained to the inflator. During inflation, the gas exiting the inflator will have a high velocity to achieve full inflation in the short time available (on the order of 10 ms). This creates a strong force tending to blow the cushion off of the inflator. With the arrangements described, there is a relatively large surface area of the cushion (i.e., the bottom wall) which resists this force. While the seam or sew line of the second arrangement does present a potential weakness, appropriate overlapping, multiple stitch lines and/or reinforcing layers can easily ensure a strong attachment.

To place the inflator within the cushion, the front end 18 of the inflator is brought toward the opening 36. The opening 36 has a size (diameter in the embodiment shown) which receives the inflator with a close sliding fit. As such, the mounting bolt will prevent a straight insertion. Therefore, the mounting bolt is first inserted into the opening 36, and the inflator thereafter rotated about a line perpendicular to both the longitudinal axis of the inflator and the mounting bolt, bringing the front end 18 of the inflator into the opening 36. To achieve this the mounting bolt must be within a certain distance of the front end, with this distance being dependant upon the amount of tolerance provided in the opening size.

Once the front end and mounting bolt are within the cushion, the remainder of the inflator is simply slid through the opening. As will be apparent from the discussion below, the mounting bolt must, however, extend through the cushion. A bolt hole 54 is therefore provided in the cushion, typically in the bottom wall. This bolt hole may be reinforced with peripheral sew lines, or addition layers of fabric if needed. The inflator is then rotated until the bolt aligns with the bolt hole, and the bolt is passed therethrough.

Figure 4:
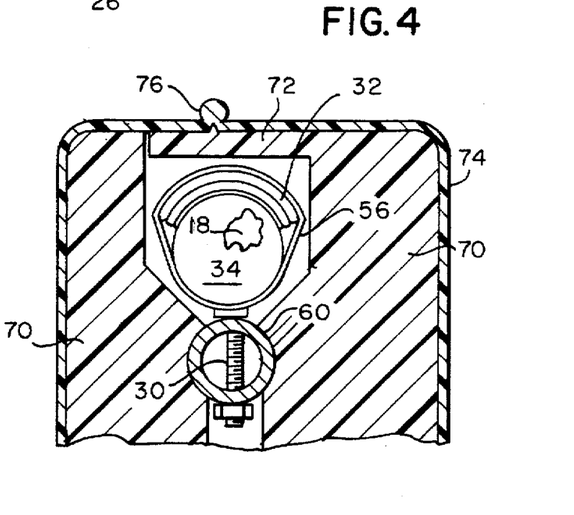
FIG. 4 is an end view of the mounted module of FIG. 3.

During this process the body of the bag may be in the folded or the unfolded state. If unfolded, the body would thereafter be folded into the desired configuration. As shown in FIGS. 3 and 4, when folded, the body of the cushion will abut against, or rest upon, the inflator. To retain the cushion in this position, and in the folded condition, there is provided a frangible wrap 56 about the folded cushion, extension 34, and the inflator therein. This wrap may be formed from a loop of material or a length of material wrapped about these items, and having its ends secured together by appropriate means, such as adhesives, thermal or ultrasonic bonding, etc. The material can take many forms, such as paper or plastic films. For plastic films, Tyvek® or similar plastics may be used to advantage, or a shrink wrap plastic may be used to ensure that the folded cushion is tightly secured in its proper position. If these materials are relatively thick, it may be desirable to provide a weakened line, such as by perforations 58, which will fail upon inflation. Thinner or weaker materials will not need such weakening, and will simply burst or tear on their own under the force of the expanding cushion.

The mounting of the module 10 will now be described with reference to FIG. 4. This description is made with reference to a seat, but it is to be understood that the module may be mounted to other elements, such as a dashboard, of a vehicle passenger cabin.

The cabin element or seat 60 is provided in the passenger cabin area of the vehicle. This element will be sufficiently rigid that it will support the module during the vibrations encountered during operation of the vehicle, as well as during the operation of the module (i.e., inflation). As noted, it is preferred that this element be a passenger seat. In particular, the module may be mounted to the back of a seat, or to the bottom of the seat. In each case it is preferred that the module be mounted along the edge, such as the edge facing the door of the vehicle. In this manner the cushion may inflate forward or upward, respectively, to interpose the cushion between the passenger and the side of the vehicle.

To mount the module to the element 60, the element is provided with a tab finger 62, and a front aperture 64 spaced from the finger. The tab finger typically has a hooked end and is sized to be received within the aperture 28 in the tab 26 of the inflator. While the tab finger could be a separate member secured to the element 60 by welding or other means, it is preferred that it be struck from the element for reduced weight and cost. The tab on the module, and the tab finger may be referred to as means for securing the rear end of the module.

The aperture 64 is placed to receive the mounting bolt 30, when the tab finger 62 is received within the aperture 64. A nut 66 may be threaded on the end of the bolt 30 to secure the module. While a threaded bolt and nut are shown, it will be realized that other arrangements known in the automotive arts, such as a smooth rod and a finger (i.e., interference fit) clip, could be employed. Additionally, a spacer 68 may be placed on the mounting bolt 30 to abut against the element 60, with the spacer having a length similar to that of the tab 26 to provide a more parallel mounting of the inflator.

As shown in FIG. 4, this mounting position may be easily achieved when the tab and the bolt extend in the same direction. As noted above, however, other orientations are possible. For example, the tab and bolt could extend laterally outward in opposite directions, while the tab finger and aperture were located on opposing side edges of a cavity receiving the module. While such mounting orientations are possible, the orientation shown in FIG. 4 is preferred, as it requires the least amount of space, needing only a rigid elongated portion of the element 60 to secure the module.

It is noted that in the mounting arrangement above, there is no housing surrounding the module. While a housing could be employed, for the preferred location upon a passenger seat, it is more desirable to not employ a housing. As may be appreciated, some protection for the module is of course required, to prevent unauthorized access to the module, and to prevent against inadvertent damage, such as to the wrap 56.

As is best shown in FIG. 4, the seat itself may provide the needed protection. Specifically, the internal seat padding 70 will surround the module at least about its sides and ends. It is also possible for a thin layer 72 of padding to overlie the module above or on the cushion, so long as the force of the inflating cushion will tear and/or displace the layer. Finally, seat upholstery 74 will cover the module, preventing access. The upholstery 74, at least in the area over the module, is chosen to have a tear strength such that the inflating cushion will burst through the upholstery, or is provided with appropriate reduced strength lines and/or tear seams 76 for the same purpose.

It is noted that during this inflation the cushion is prevented from any tendency to inflate uniformly about the inflator. In other words, while the body of the cushion moves outward, the extension 34 will remain closely adjacent the inflator and does not move away from the inflator in the opposite direction (i.e., into the seat). This is due to several factors. First, part of the extension portion of the cushion is retained by virtue of being interposed between the mounting bolt 30 and the element 60 of the vehicle. Further, the opening 36 in the extension also serves to anchor the extension to the inflator. Finally, any portions of the element 60 which are adjacent the bottom or side walls 38–42 of the extension will serve to prevent expansion of the extension.

It is noted that inflation of the extension 34 would typically result in the opening 36 sliding along the inflator toward the front wall 44, due to outward movement of the side walls 40, 42. As such, preventing this sliding is a further method of preventing unwanted inflation of the extension. One method to achieve this is by providing the cushion extension 34 with a tab strap 78, as shown in the drawings. The strap 78 extends rearward from the opening 36, and includes an aperture 80. The aperture 80 may receive the mounting tab 26. As may be envisioned, the strap prevents movement of the opening 36 toward the front, thus reducing the inflation of the extension.

From the above description it can be seen that the invention provides various advantages. For example, the provision of the mounting tab and the mounting bolt on the inflator is not appreciably more costly than many prior art arrangements for securing the inflator, and is less costly than many. The attachment of the cushion to the inflator is quite sturdy, yet is very simple, low cost, and light weight. Further, the use of the wrap to hold the cushion provides a secure and inexpensive arrangement which is very inexpensive compared to prior art housings.

Mounting of the module is also quite fast and simple. First, the tab 26 is placed so that the tab finger 62 is received within the aperture 28 of the tab. Thereafter the module is rotated to insert the mounting bolt 30 into the aperture 64. The nut 66 is thereafter threaded on the bolt 30 to secure the entire module to the element. As such, a single fastener is used to secure the entire module. It is noted that the tab and tab finger placement could of course be reversed, such that the module included a tab finger and the element included a tab and/or aperture.

With reference to FIGS. 7 and 8, a second embodiment of a module according to the present invention is generally designated by reference numeral 82. The module 82 again includes an inflator 84 and a cushion 86. In this embodiment each of the inflator, cushion, and mounting arrangement are modified.

First, the inflator 84 is generally similar in that it includes a body 88 (shown here as cylindrical), having a front end 90, a rear end 92, and a diffuser 94 with exit ports. As before, the ports need not be limited to the end of the body as shown, but could extend along the length of the body. Also, the directional designations, such a "front" and "rear" are again used solely for ease of description. This embodiment differs from the first, however, in that there is no mounting tab extending from the body. Additionally, while the inflator does have a mounting bolt 96 extending therefrom, the bolt extends along the longitudinal axis of the inflator. The mounting bolt may advantageously be formed by a threaded section of the initiator or squib, mounted to the end of the inflator. As such, a sensor wiring harness 98 may be connected to the free end of the mounting bolt/squib.

The cushion also is generally similar in that it includes a body 100 (shown in the folded condition in FIG. 9) and an integral extension 102 to secure the cushion to the inflator. The extension includes an appropriately placed bolt hole (unnumbered) in its front wall. Additionally, the extension includes an opening 104 which receives the inflator such that the inflator is within the cushion. In contrast with the first embodiment, however, the extension 102 of the cushion includes a variation in the opening 104. In particular, the extension includes a surrounding skirt 106 extending rearward from the opening. The skirt extends from the entire periphery of the opening, and preferably has a generally constant diameter substantially equal to that of the opening.

In assembling the module 82 the inflator is inserted through the opening 104 by sliding along its longitudinal axis. The skirt is sized to permit this sliding, although a close sliding fit is preferred. If the body of the cushion has not already been folded prior to insertion of the inflator it is folded at this time. Thereafter, a frangible wrap 108, similar to that described above, is applied to secure the cushion in the folded condition.

As before, the module is mounted to an element 110 of the vehicle passenger cabin, which is again preferably an edge of the back or bottom of a passenger seat. For this embodiment, the element 110 is provided with front and rear spaced, upstanding mounting rings 112 and 114, respectively. The mounting rings may be attached to the element 110 by fasteners or welding, or may be struck from the element 110, as shown.

The front and rear mounting rings include apertures 116 and 118, respectively. The front aperture is sized to receive the mounting bolt 96, while the rear aperture is sized to receive the body of the inflator and the surrounding skirt 106. The rear aperture is preferably as tight as possible over the skirt and inflator, while still permitting relatively easy insertion.

As may be envisioned, to mount the module to the element, the module is positioned near to its final position, with the rear end of the module tilted toward the rear mounting ring 114. The rear end of the module is then inserted into the rear aperture, sliding the module toward the rear. This insertion is continued until the free end of the mounting bolt has cleared the front mounting ring 112. At this point the length of module extending through the rear aperture is at least slightly greater than the length of the mounting bolt.

The module is then be rotated to bring the mounting bolt into alignment with the front aperture. The module is next slid toward the front, inserting the mounting bolt into the front aperture. The amount of sliding required for this, however, is not sufficient to remove the rear end of the module front the rear mounting ring. As such, both ends of the module are received within the apertures. Thereafter a nut 120 or other fastener may be fixed on the mounting bolt to prevent further sliding. Alternatively, the front aperture could be threaded to secure the mounting bolt without an additional nut. As may be seen, in this embodiment the rear end of the module and the rear mounting ring together define the means for securing the rear end of the module.

In operation, a signal from the harness 98 will cause the inflator 84 to begin the rapid expulsion of inflation gas. As with the previous embodiments, the presence of the bolt hole and opening 104 in the extension serve to maintain the extension in close proximity to the inflator, rather than being blown away. With this embodiment there is again the tendency for the opening 104 to slide forward due to inflation of the extension. However, the skirt 106, together with the rear mounting ring, serve to hold the opening in position.

Specifically, upon expansion of the extension due to gas pressure, the rear wall of the extension is placed in tension. The opening 104 and the skirt are of course located in this rear wall. This tension serves to slightly expand the diameter of the opening causing it to be held tight against the edge of the rear aperture. Additionally, the pressurized gas will try to flow between the skirt and the inflator to exit the cushion. This will also tend to expand the skirt, causing it to further hold the extension against the rear aperture. This increase in friction due to the pressing of the fabric against the aperture serves to hold the skirt in position, and halt the sliding of the opening along the inflator body.

As is apparent, this second embodiment provides all the advantages of the first embodiment. It is fast and relatively easy to install, requiring only a single fastener. It is also light weight and relatively simple to manufacture. With this embodiment there is the need, however, to insert the rear end of the inflator, with the surrounding skirt, through the rear aperture. While this is of course easier with larger tolerances between the aperture and module, a close fit is desired to reduce the escape of gas past the skirt. The insertion of the module through the rear aperture may therefore require greater skill than the other operations to mount this module.

Figure 9:
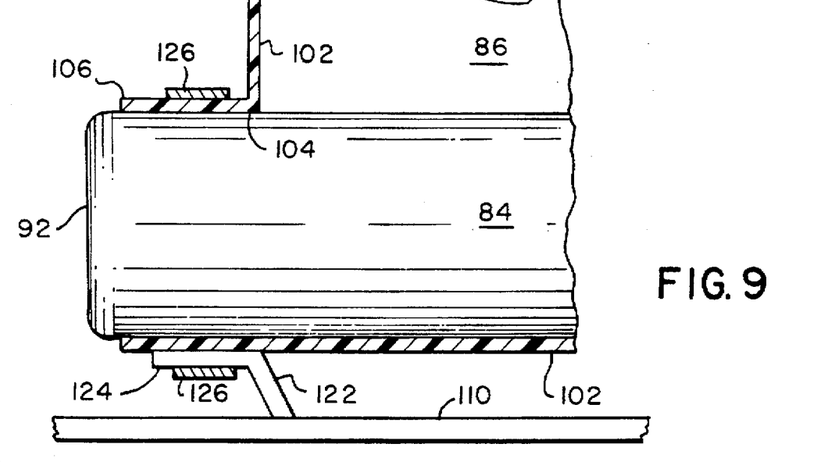
FIG. 9 is a side view with partial cutaway of a second mounting arrangement.
Figure 10:
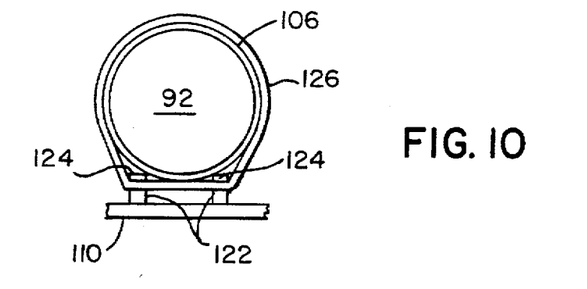
FIG. 10 is an end view of the arrangement of FIG. 9.

This can be alleviated by a different rear mounting arrangement, as shown in FIGS. 9 and 10. With this arrangement, the same module 82 is employed, with the cushion extension 102 being provided with the same skirt 106. However, there is no rear aperture through which the module must be inserted.

In particular, with this arrangement the cabin element 110 includes at least one support leg 122 extending therefrom. The leg may be attached to the element, but preferably is struck therefrom. The support leg includes a support portion 124 which will physically abut against the module, and in particular the rear end of the inflator, over the skirt 106. While a single support leg may be used, two legs 122, spaced laterally, can effectively cradle the module, providing a more stable mounting, as shown in FIG. 10.

The module is secured to the support leg(s) by use of a binding ring 126. The binding ring will extend about the rear end of the module, over the skirt, and also over the support portion 124, tightly binding these items together. Specifically, the module is secured to the support leg(s), and the skirt is secured against the inflator, as is apparent from FIG. 10. To effect this, the binding ring must of course exert a compressive force. Suitable binding rings may thus include elastic bands, screw ring clamps, crimp ring clamps, etc.

To use this mounting arrangement the mounting bolt 96 of the inflator is inserted into the front aperture of the front ring, and the rear end of the module is held against the support legs. The binding ring is then placed over the skirt and support legs, and tightened. As such, there is no need to insert the rear end of the module into a small tolerance aperture. While the ring 126 must be placed over the rear end, the ring may have a relatively large tolerance before tightening, and thus be easily slipped over the end. Therefore, while this arrangement does require two fasteners, it may be faster and easier to install overall. It is noted that in this embodiment the rear of the module, support legs, and binding ring all define the means for securing the rear end of the module.

Figure 11:
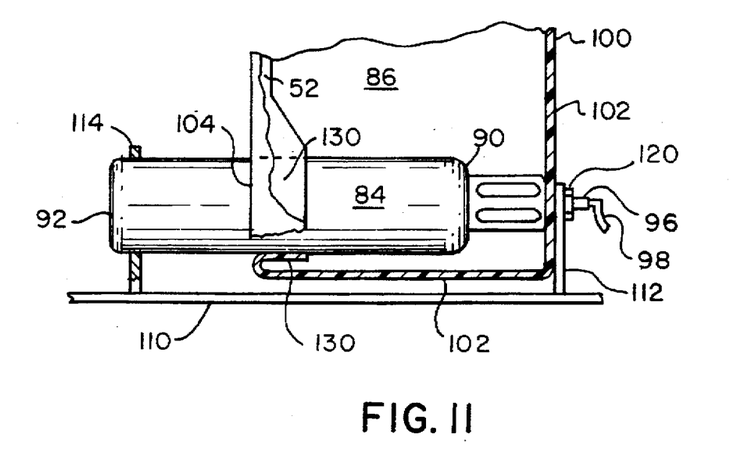
FIG. 11 is a side view with partial cutaway of a third embodiment of a cushion extension to receive the inflator.

It is possible, however, to eliminate the need for the second fastener, and the need for inserting the skirt through an aperture. This is illustrated in the arrangement of FIG. 11. In this arrangement most elements are similar to that of FIGS. 7 and 8, and are numbered as such.

With this arrangement, the cushion extension 102 includes an opening 128 to receive the inflator, but has a reduced length in the front-to-rear (longitudinal) direction, at least relative to that of the inflator 84. As such, a portion of the rear end 92 of the inflator will extend outward beyond the opening 128. This portion will preferably have a length at least to allow the module to be mounted to the rings 112 and 114 (following the installation procedure outlined for the arrangement of FIGS. 7 and 8) without the rear ring 114 contacting (and thereby pushing forward) the opening 128.

By placing the opening this far forward, the module may be more easily mounted to the rings. In particular, the rear end of the inflator is typically formed of metal, as is the mounting ring. As such, these rigid items may be more easily and quickly aligned to permit passage of the rear end through the aperture 118. Additionally, there is no need to ensure that the skirt slides with the inflator through the aperture, since there is no skirt employed. Finally, since the rear ring will not affect the sealing of the cushion, described more fully below, the tolerance between the ring and the rear end of the inflator may be larger. There is a drawback to this, however, in that the skirt would attenuate rattling of the inflator against the ring, and this attenuation is lost with this arrangement.

Since the ring does not assist in sealing the opening 128 and in preventing forward sliding of the opening upon inflation, it is preferred to provide other means. Specifically, the cushion extension 102 is provided with a sealing lip 130 at the opening 128. The sealing lip surrounds the periphery of the opening, and extends inward of the cushion (i.e., forward of the inflator). The lip preferably has a substantially constant diameter which provides a close sliding fit over the inflator body. The lip may advantageously be formed as an extension of the seam 52, with the securing means for the seam (e.g., stitching), extending along the length of the lip to ensure the close fit along its length. In general terms, the lip may be considered as a skirt 106 which has been folded inward of the cushion.

As may be envisioned, the lip permits standard sliding insertion of the inflator into the cushion. As noted above, the lip also does not interfere with insertion into a rear aperture. Additionally, upon activation of the inflator, the gas pressure will tend to press the lip 130 to the body of the inflator, forming a seal. This seal of course serves to prevent unwanted venting of gas. However, the friction of the seal also prevents sliding of the aperture forward. Moreover, this sealing lip arrangement is fully compatible with the single fastener mounting. However, if rattling of the inflator within the ring is a problem, it is also compatible with the support leg/binding ring arrangement of FIGS. 10 and 11.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims. For example: the radially extending bolt 30 of FIG. 1 could be used with the support leg/binding ring mounting arrangement of FIGS. 9 and 10; the longitudinally extending mounting bolt of FIG. 7 could be used with the mounting tab/tab finger of FIG. 4; and the sealing lip 130 of FIG. 11 could be used with the embodiment of FIG. 1. These are of course only examples of the combinations possible.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An airbag module, comprising:
   an inflator assembly having an elongated body with from and rear ends and at least one gas exit port, said assembly including a mounting tab extending from said rear end, said tab including an aperture therein;
   a cushion operatively associated with said inflator assembly, said cushion having a body and an extension, said extension including an opening to receive at least a portion of the inflator which includes said port, and at least said front end of said inflator being received within said extension and said rear end of said inflator extending outward of said opening, said extension being constructed and arranged to maintain said cushion operatively associated with said inflator during gas generation.

2. A module as in claim 1, wherein said cushion body is in a folded condition and abuts said inflator assembly body, and further including a frangible wrap surrounding said cushion body and extension, such that said cushion body is interposed between said inflator assembly and said wrap, with said wrap holding said cushion body in said folded condition.

3. A module as in claim 1, wherein said tab extends peripherally outward.

4. A module as in claim 1, wherein said cushion extension further includes a tab strap adjacent said opening, said tab strap including a strap aperture, and wherein said tab extends through said strap aperture, said tab limiting movement of said opening toward said front end of said inflator.

5. A module as in claim 4, wherein said cushion body is in a folded condition and abuts said inflator assembly body, and further including a frangible wrap surrounding said cushion body and extension, such that said cushion body is interposed between said inflator assembly and said wrap, with said wrap holding said cushion body in said folded condition.

6. A module as in claim 1, wherein said cushion extension further includes a skirt extending outward from said opening toward said rear end of said inflator assembly, said skirt extending from the periphery of said opening and having a diameter substantially constant along its length and substantially equal to that of said opening, and forming a close sliding fit over said rear end of said inflator assembly.

7. A module as in claim 6, wherein said rear end of said inflator assembly extends outward beyond said skirt.

8. A module as in claim 6, wherein said cushion body is in a folded condition and abuts said inflator assembly body, and further including a frangible wrap surrounding said cushion body and extension, such that said cushion body is interposed between said inflator assembly and said wrap, with said wrap holding said cushion body in said folded condition.

9. A module as in claim 1, wherein said cushion extension further includes a sealing lip extending therefrom toward said front end of said inflator assembly and thus into said cushion, said lip extending from the periphery of said opening and having a diameter substantially constant along its length and substantially equal to that of said opening.

10. A module as in claim 9, wherein said cushion body is in a folded condition and abuts said inflator assembly body, and further including a frangible wrap surrounding said cushion body and extension, such that said cushion body is interposed between said inflator assembly and said wrap, with said wrap holding said cushion body in said folded condition.

11. An airbag module, comprising:

an inflator having an elongated body with front and rear ends and at least one gas exit port;

a cushion operatively associated with said inflator, said cushion having a body and an extension, said extension including an opening to receive at least a portion of the inflator which includes said port, and at least said front end of said inflator being received within said extension and said rear end of said inflator extending outward of said opening, said extension further including a skirt extending outward from said opening toward said rear end of said inflator, said skirt extending from the periphery of said opening and having a diameter substantially constant along its length and substantially equal to that of said opening, and forming a close sliding fit over said rear end of said inflator.

12. A module as in claim 11, wherein said rear end of said inflator extends outward beyond said skirt.

13. A module as in claim 11, wherein said inflator further includes a mounting bolt extending therefrom adjacent said front end, and said extension further includes a bolt hole through which said mounting bolt extends.

14. A module as in claim 13, wherein said mounting bolt extends longitudinally.

15. A module as in claim 11, in combination with an element within a passenger cabin of a vehicle and a rear mounting ring, said rear mounting ring being mounted on said element, and said ring including a rear aperture, said rear end of said inflator being received within said rear aperture.

16. The combination of claim 15, wherein said rear end of said inflator extends outward beyond said skirt.

17. The combination of claim 15, wherein said skirt is received within said rear aperture, whereby said skirt is interposed between said inflator body and said rear mounting ring.

18. The combination of claim 15, further including a front mounting ring having a front aperture, said front mounting ring being mounted upon said element, and wherein said cushion extension further includes a bolt hole, and said inflator further includes a mounting bolt extending therefrom adjacent said front end of said inflator, said mounting bolt extending through said bolt hole and said front aperture.

19. A module as in claim 11, in combination with an element within a passenger cabin of a vehicle, at least one support leg having a support portion, and a binding ring, said support leg being mounted to said element, said rear end of said inflator being in proximity to said support portion, and said binding ring surrounding said inflator and support portion and securing same together.

20. The combination of claim 19, wherein said at least one support leg comprises two of said support legs.

21. The combination of claim 19, wherein said rear end of said inflator extends outward beyond said skirt.

22. The combination of claim 19, wherein said skin is interposed between said inflator body and said support portion.

23. The combination of claim 19, further including a front mounting ring having a from aperture, said front mounting ring being mounted upon said element, and wherein said cushion extension further includes a bolt hole, and said inflator further includes a mounting bolt extending therefrom adjacent said front end of said inflator, said mounting bolt extending through said bolt hole and said front aperture.

24. An airbag module, comprising:

an inflator having an elongated body with front and rear ends and at least one gas exit port;

a cushion operatively associated with said inflator, said cushion having a body and an extension, said extension including an opening to receive at least a portion of the inflator which includes said port, and at least said front end of said inflator being received within said extension and said rear end of said inflator extending outward of said opening, said extension further including a sealing lip extending inward from said opening toward said front end of said inflator and thus into said cushion, said sealing lip extending from the periphery of said opening and having a diameter substantially constant along its length and substantially equal to that of said opening, and forming a close sliding fit over said inflator body, whereby gas pressure within said cushion will press said lip against said inflator body to form a seal against egress of gas from said opening, said interior of said cushion being free of mechanical restraint pressing said lip against said inflator body.

25. A module as in claim 24, wherein said inflator further includes a mounting bolt extending therefrom adjacent said front end, and said extension further includes a bolt hole through which said mounting bolt extends.

26. A module as in claim 25, wherein said mounting bolt extends longitudinally.

27. A module as in claim 24, in combination with an element within a passenger cabin of a vehicle and a rear mounting ring, said rear mounting ring being mounted on said element, and said ring including a rear aperture, said rear end of said inflator being received within said rear aperture.

28. The combination of claim 27, further including a front mounting ring having a front aperture, said front mounting ring being mounted upon said element, and wherein said cushion extension further includes a bolt hole, and said inflator further includes a mounting bolt extending therefrom adjacent said front end of said inflator, said mounting bolt extending through said bolt hole and said front aperture.

29. The combination of claim 28, further including a front mounting ring having a front aperture, said front mounting ring being mounted upon said element, and wherein said cushion extension further includes a bolt hole, and said inflator further includes a mounting bolt extending therefrom adjacent said front end of said inflator, said mounting bolt extending through said bolt hole and said front aperture.

* * * * *

UNITED STATES PATENT AND TRADEMARK OFFICE
CERTIFICATE OF CORRECTION

PATENT NO. : 5,667,241
DATED : September 16, 1997
INVENTOR(S) : S.M. Bunker, D.G. Minert, D.J. Green
D.G. Saderholm and J.K. Storey It is certified that error appears in the above-indentified patent and that said Letters Patent is hereby corrected as shown below:

At column 3, line 34, "types Of" should be --types of--.

At column 10, line 23, "body with from" should be
         --body with front--.

At column 10, line 32, "said inflator" should be
         --said inflator assembly--.

At column 12, line 11, "a from aperture," should be
         --a front aperture,--.

Signed and Sealed this

Twenty-third Day of December, 1997

Attest:

BRUCE LEHMAN

Attesting Officer

Commissioner of Patents and Trademarks